July 29, 1958

C. F. ROBINSON 2,845,136

CHROMATOGRAPHY

Filed Sept. 12, 1955

INVENTOR.
CHARLES F. ROBINSON

BY

Christie, Parker & Hale
ATTORNEYS

United States Patent Office 2,845,136
Patented July 29, 1958

2,845,136

CHROMATOGRAPHY

Charles F. Robinson, Pasadena, Calif., assignor, by mesne assignments, to Consolidated Electrodynamics Corporation, Pasadena, Calif., a corporation of California Application September 12, 1955, Serial No. 533,563

5 Claims. (Cl. 183—2)

This invention relates to chromatography and particularly to improvements in chromatographic column packing.

"Gas chromatography" is a term which may properly be applied either to adsorption chromatography or gas-liquid partition chromatography. In adsorption chromatography a column containing appropriate adsorbent, usually in granular form, is used to separate the various constituents of a gas sample. The sample is generally introduced to the column in a carrier gas stream continuously flowing through the column. Under proper conditions, various components of the gas sample are spatially separated by the process of selective adsorption and desorption so that the separated gas constituents issue from the end of the column in sequential order corresponding to their relative volatility, their molecular weight or other property affecting the degree of adsorption on the packing material in the column. Conventionally, as the separated gases emerge, they are passed through a suitable detector element which in some way measures a property of the gas indicative of the character and amount present.

The essential feature of gas-liquid partition chromatography is the provision in the chromatographic column of an extensive liquid surface over which the gases flow. Normally this is accomplished by disposing the liquid in static condition as a very thin coating over the large exposed surface of an inert support. When a gas sample is passed through a column of this type the continuous solution and evaporation which takes place along the column makes it in effect a distillation operation in which the lighter components are carried more rapidly to the outlet of the column than the heavier ones.

The packings most commonly used in chromatographic columns at the present time are activated carbon, alumina, silica gel, and, in the case of the gas-liquid partition chromatographic column, a high boiling liquid disposed on a relatively inert carrier such as diatomaceous earth. The various liquids presently used for this purpose include mineral oil, di-octyl phthalate, di-nonyl phthalate, silicone, nitrobenzene, tricresyl phosphate, dibutyl phthalate, and the like.

The choice of the particular adsorbent or of the particular liquid to be used in partition chromatography depends upon the system under consideration. Conventionally the packing, whatever form is chosen, for a particular chromatograph column, is poured into the column in granular form and compacted therein by vibration, tamping or the like. It has been the experience that such columns are prone to develop channels or to otherwise change their properties when subjected to vibration in handling or shipment. Furthermore, it is known that the optimum configuration for chromatograph packing is one in which the average diffusion rate transverse to the nominal axis of gas flow through the column is large compared to the diffusion rate parallel to this nominal axis. There is no means for realizing this desirable relationship by normal packing techniques.

I have now developed a type of packing which is superior to that heretofore employed in that objectionable channeling is absolutely prevented and the average diffusion rate transverse to the nominal axis can be readily established at any desired high ratio compared to the diffusion rate in the direction of the nominal axis. The invention contemplates in a chromatographic column having a fluid inlet and fluid outlet, the combination comprising a plurality of permeable refractory wafers disposed in the column transversely of the normal direction of fluid flow between the inlet and outlet whereby fluids flowing through the column are caused to pass through the several wafers.

Although it is within the contemplation of the invention to prepare any suitable packing material in the form of wafers adapted to be stacked in a column in accordance with the invention and in a manner more particularly described in relation to the drawing, preference is given to the use in this form of a type of material not heretofore found in chromatograph columns. Specifically it is preferably intended to employ thin wafers of etched, unsintered, highly porous glass. Glass of this type is available commercially, being referred to as porous glass and sold under the trade name "Vycor." This type of glass is readily adapted to fabrication in thin wafers, which exhibit an extremely high surface area of about $3.4 \times 10^6$ square centimeters per cc. of volume. Such a high surface area per unit volume can exist only through the presence of a large number of interconnected pore spaces of capillary size within each wafer. These wafers are exceedingly strong, are chemically resistant, being approximately 96.0% $SiO_2$, and furnish an excellent stable support, particularly for the stationary liquid phase in a partition chromatograph. The surface area of this material is approximately three times the surface to volume ratio of cocoanut charcoal, which is considered to have a very high surface area.

The invention will be clearly understood with reference to the following detailed description taken in conjunction with the accompanying drawings, in which.

The drawings are described with relation to the use of porous glass as above described, although it is to be understood that any suitable adsorbent material capable of fabrication into wafers as illustrated comes within the scope of the present invention. A typical wafer 10 is shown in section in Fig. 1 and plan view in Fig. 2. This wafer has central depressed areas 11, 12 in its opposite faces forming upper and lower annular rims 13 and 14 respectively for the purposes which will become apparent in the discussion of Fig. 3.

Figure 3:
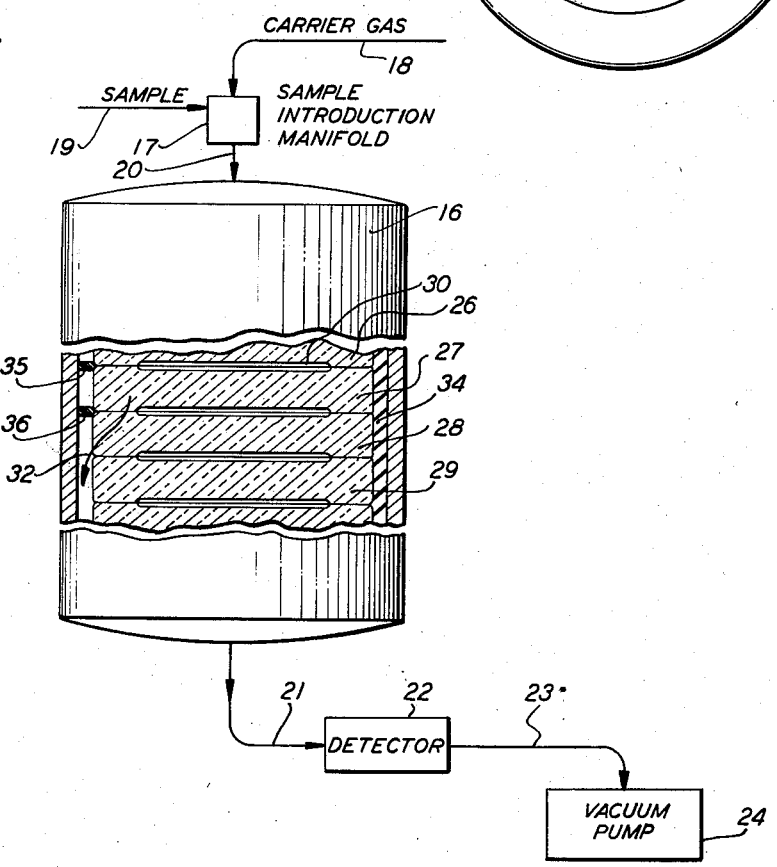
Fig. 3 is a schematic illustration of a chromatograph system showing the packing in the column which is partially in section and alternate means of installation in the column.

In Fig. 3, a typical chromatograph system is shown as including a packed column 16, a gas inlet manifold 17 connected to a carrier gas inlet 18, a sample inlet 19 and into the top of column 16 through a line 20. The lower end of the column is connected through a line 21 to a detector 22, the detector in turn being vented to atmosphere or connected through a line 23 to a vacuum pump 24. The components and refinements of the system itself form no part of the present invention. Any suitable form of sample inlet means may be employed as well as any suitable form of detector. The detector, for example, may comprise a thermal conductivity cell, an infrared analyzer, a mass spectrometer or any other suitable mechanism or technique for gas analysis.

Figure 1:
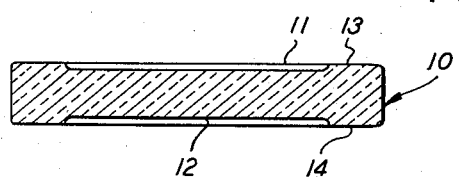
Fig. 1 is a transverse sectional elevation of an adsorbent wafer of the type herein proposed for packing chromatograph columns.
Figure 2:
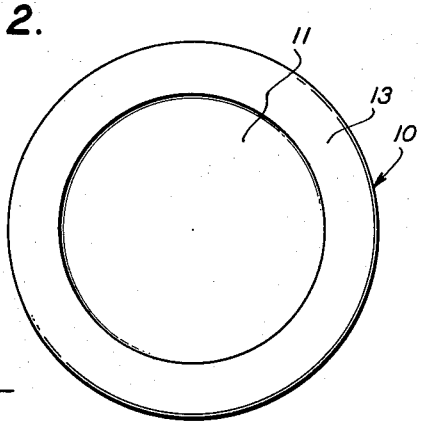
Fig. 2 is a plan view of the wafer of Fig. 1.

In the drawing the central portion of column 16 is shown in section and enclosing a plurality of separate adsorbent wafers 26, 27, 28, 29, each of which may be identical to the wafer 10 shown in Figs. 1 and 2. The annular rim formed on each side of the several wafers hold the central portions of the wafers apart so that between each wafer there is a thin transversely elongated free space, this space between wafers 26 and 27 being identified by the reference numeral 30. This free space provides a large average transverse component of diffusion, previously indicated as desirable.

It is of course necessary to so support the packing wafers within the column as to prevent diffusion and channeling along the stack. If no provision is made to prevent such diffusion, gas flow can readily take place as indicated in the drawing by the flow line 32. By-passing, as indicated by flow line 32, will obviously disturb the required equilibrium conditions in the column. One means of accomplishing the objective of preventing this channeling as shown in the drawing comprises potting the stack in suitable potting material 34. This material may be conventional potting metal such as lead, or may be chemically resistant plastic such as polyethylene, Teflon or silicone resins. Alternatively, annular sealing members 35, 36, which again may consist of polyethylene, Teflon, silicone resins, lead washers or the like, may be inserted between each packing disk to accomplish the same objective. Other techniques not readily susceptible of illustration for preventing channeling or gas diffusion lengthwise of the stack embody fire-polishing the edges of the wafers after etching so as to prevent gas egress in the manner shown by the flow line 32. Another similar technique also not readily susceptible to illustration comprises platinizing the edges and soldering the entire stack of wafers into one solid mass.

When the column as illustrated in Fig. 3 is to be used for gas adsorption chromatography, it is ready for operation upon completion of the packing. The manner of operation forms no part of the present invention and the usual conventional steps of activation etc. will generally be employed. If the column is to be used for gas-liquid partition chromatography, the stack of wafers is initially charged with the stationary liquid phase. The manner of so charging the packing also forms no part of the present invention. One convenient technique for so doing is to incorporate the stationary liquid phase in solution in a volatile solvent, soak the packing in this solution and evaporate the volatile solvent therefrom. This leaves the relatively higher boiling stationary liquid phase uniformly dispersed throughout the packing.

A column pack in accordance with this invention exhibits a shock resistance, a handling tolerance and a life stability greatly in excess of any of the column packings heretofore employed. The present packing for the first time permits the fabrication of a portable chromatographic system for field operation.

I claim:

1. In a column for the chromatographic separation of a gas sample flowing through the column from a fluid inlet to a fluid outlet, the combination comprising a plurality of structurally stable permeable refractory wafers of a diameter approximating the inside diameter of the column disposed in substantially uninterrupted face-to-face contact transversely in the column between said fluid inlet and said fluid outlet, the several wafers constituting means to impart substantially uniform distribution of flowing gas throughout substantially the entire cross-sectional area of the column and throughout that portion of the length of the column filled by the wafers, and means sealing the wafers with the column wall to prevent gas flow between the circumference of the individual wafers and the walls of the column whereby gas flowing through the column is constrained to pass sequentially through the several wafers.

2. Apparatus according to claim 1 wherein the wafers are initially charged with a stationary liquid phase with which said gas sample comes in intimate contact in its flow through the column.

3. Apparatus according to claim 1 wherein each wafer has a shallow central relieved area in both its opposite transverse faces leaving a slightly elevated annular rim for intimate contact with the like rim of the next adjacent wafer.

4. Apparatus according to claim 1 wherein the wafers are sealed with respect to the column wall with a chemically resistant impervious bonding material.

5. Apparatus according to claim 1 wherein the wafers are composed of etched unsintered glass.

References Cited in the file of this patent

UNITED STATES PATENTS

| | | |
|---|---|---|
| 1,422,211 | Lamb | July 11, 1922 |
| 2,556,292 | Newcum | June 12, 1951 |
| 2,683,029 | Ricardo | July 6, 1954 |